United States Patent [19]

Tsumori et al.

[11] Patent Number: 4,846,592
[45] Date of Patent: Jul. 11, 1989

[54] ROLLING BEARING

[75] Inventors: Yukihisa Tsumori; Takayasu Takubo, both of Kuwana, Japan

[73] Assignee: NTN Toyo Bearing Co., Ltd., Osaka, Japan

[21] Appl. No.: 183,579

[22] Filed: Apr. 19, 1988

[30] Foreign Application Priority Data

Apr. 25, 1987 [JP] Japan .............................. 62-63063[U]

[51] Int. Cl.$^4$ ...................... F16C 33/66; F16C 33/72; F16J 15/34; F16J 15/54
[52] U.S. Cl. ..................................... 384/473; 277/23; 277/95; 277/235 R; 384/477
[58] Field of Search ........................ 384/477, 484–486; 277/23, 235 R, 234, 277, 95, 152

[56] References Cited

U.S. PATENT DOCUMENTS

| 2,237,616 | 4/1941 | Smith | 384/477 |
|---|---|---|---|
| 4,159,828 | 7/1979 | Östling et al. | 277/152 X |
| 4,541,741 | 9/1985 | Woodbridge et al. | 384/477 X |

FOREIGN PATENT DOCUMENTS

| 1171678 | 6/1964 | Fed. Rep. of Germany | 384/484 |
|---|---|---|---|
| 1319953 | 6/1973 | United Kingdom | 384/462 |

Primary Examiner—Thomas R. Hannon
Attorney, Agent, or Firm—Armstrong, Nikaido, Marmelstein, Kubovcik & Murray

[57] ABSTRACT

An annular oil filter for covering an open end of a rolling bearing has its outer edge held between two annular retainer plates, the outer edges of which are held by a rubber mold to unite them into one body. The rubber mold is resiliently received in an annular groove formed in the inner wall of an outer ring at its end. The oil filter has its inner edge in contact with a shoulder formed on the outer wall of an inner ring.

7 Claims, 1 Drawing Sheet

ROLLING BEARING

BACKGROUND OF THE INVENTION

The present invention relates to a rolling bearing with an oil filter for use with a reduction gear or the like.

A bearing in a reduction gear or the like is lubricated by splashing the lubricating oil in the reduction gear so that the splashed oil will find its way into the bearing. It is a common practice to cover the end opening of the bearing with an oil filter in order to prevent dust and iron powder mixed in the lubricating oil from coming into the bearing (see e.g. Japanese Utility Model Publication No. 33-9307).

The rolling bearing disclosed in this publication is shown in FIG. 2. It comprises an outer ring 1 formed in its inner wall at its end portion with an annular groove 2, an inner ring 6 formed in its outer wall at its end portion with a stepped portion 7, inside and outside annular retainer plates 3 and 4 having their outer circumferential edges press-fitted in the annular groove 2, and an oil filter 5 having its outer edge held between the inner edges of the retainer plates 3 and 4 and having its inner edge in abutment with the shoulder of the stepped portion 7 of the inner ring 6.

It is an effective way to caulk together the outer edges of the inside and outside retainer plates 3 and 4 so as to grip the oil filter 5 therebetween. But it is not a reliable method to unite two retainer plates together by caulking because poor caulking sometimes results.

SUMMARY OF THE INVENTION

It is an object of the present invention to provide a rolling bearing in which an oil filter and retainer plates can be coupled together not by caulking but by another method.

In accordance with the present invention, there is provided a rolling bearing having an outer ring, an inner ring, an annular retainer means having the outer edge thereof mounted on the outer ring and an oil filter having an outer edge portion thereof held by the retainer means and an inner edge portion thereof in contact with the inner ring, characterized in that the retainer means comprises an annular inside plate, an annular outside plate, and a rubber mold for covering the outer edge of the inside and outside retainer plates to unite them together into one body with the outer edge of the oil filter held between the inside retainer plate and the outside retainer plate.

Other features and objects of the present invention will become apparent from the following description taken with reference to the accompanying drawings, in which:

DETAILED DESCRIPTION OF THE PREFERRED EMBODIMENT

Figure 1:
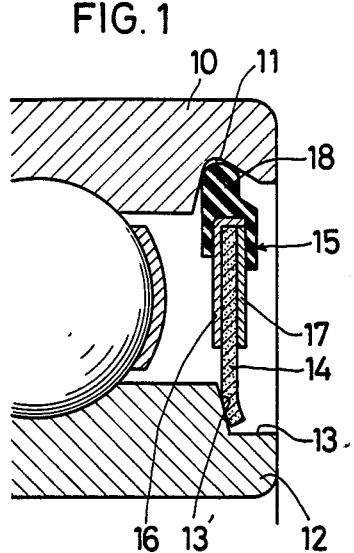
FIG. 1 is a partial enlarged sectional view of an embodiment of the present invention.
Figure 2:
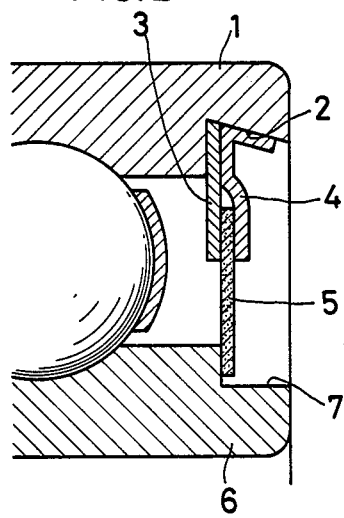
FIG. 2 is a similar view of the prior art bearing.

Now referring to FIG. 1 which shows the roller bearing according to the present invention, an outer ring 10 is formed in its inner wall at its end portion with an annular groove 11. An inner ring 12 is formed in its outer wall at its end portion with a stepped portion 13 opposite to the annular groove 11.

A retainer means 15 for holding the outer edge of an annular oil filter 14 comprises an annular inside retainer plate 16, an annular outside retainer plate 17 and a rubber mold 18. The inside retainer plate 16 has its outer edge portion bent at a right angle so that its outer edge will overlap the outer edge of the outside retainer plate 17. Thus, the inside and outside retainer plates are formed into a U-shape section as a whole.

The oil filter 14 is an annular member of unwoven cloth or filter cloth made of high-molecular organic fiber or inorganic fiber and has such a mesh size as to allow the permeation of fine dust smaller in particle size than 50–70 microns and to remove coarser dust.

The oil filter 14 is firstly inserted at its outer edge portion into between the retainer plates 16 and 17. Then the rubber mold 18 is fitted over the outer edge of the retainer plates 16 and 17 holding the oil filter 14 to unite them together into one body.

As shown in FIG. 1, the rubber mold 18 has a larger thickness in the radial direction of the retainer plates 16 and 17 than the thickness in the axial direction and is inserted into the annular groove 11 with some extent of elasticity.

The oil filter 14 has its inner edge portion or lip portion pressed against a shoulder 13' of the stepped portion 13 of the inner ring 12 so as to be resiliently bent slightly outwardly.

According to the present invention, the inside and outside retainer plates holding the oil filter therebetween can be united together into one body more reliably and rapidly than with the conventional caulking method merely by capping their outer edge portions with the rubber mold.

Since the rubber mold holding the oil filter through the retainer plates resiliently deforms when inserted into the annular groove formed in the outer ring, it can be easily snapped into its position. Once set in position, it remains in close contact with the inner wall of the outer ring 10 at tee annular groove 11 to effectively keep the dust from coming into the bearing through the space therebetween.

What is claimed is:

1. An oil filter assembly for a roller bearing assembly comprising:

an outer ring having a relatively wide annular groove;

an inner ring positioned within said outer ring and holding a plurality of roller bearings therebetween, said inner ring having a shoulder at one side thereof substantially corresponding to said wide annular groove, a distance between a central axis of said roller bearings and a center of said shoulder being longer than a distance between said central axis of said roller bearings and a central axis of said wide annular groove;

an annular oil filter plate covering an annular side clearance between said outer and inner rings;

an annular retainer plate means for retaining an outer periphery of said annular oil filter plate, said annular retainer plate means having a pair of plates, one of said plates having a bent outer peripheral edge having a cross-section of substantially L-shape such that said bent outer periphery edge overlaps upon an outer peripheral edge of the other plate; and an annular rubber mold means for retaining said annular retainer plate means and said annular oil filter plate, said annular rubber mold means having an annular groove at an inner periphery thereof for inserting said annular retainer plate means and said annular oil filter plate therein and further having an annular projection at an outer periphery thereof for sealingly engaging with said wide annular groove of said outer ring, wherein an inner periphery of said oil filter sealingly contacts with said shoulder.

2. The oil filter assembly for a roller bearing assembly according to claim 1, wherein said annular oil filter plate is a cloth made of high-molecular organic fibers.

3. The oil filter assembly for a roller bearing assembly according to claim 2, wherein said cloth has a mesh size such that said cloth allows permeation of fine dusts having particular size smaller than 50–70 microns.

4. The oil filter assembly for a roller bearing assembly according to claim 2, wherein said annular projection of said annular rubber mold means has a circular cross-section, and further wherein a radius of curvature of said circular cross-section is longer than that of said wide annular groove.

5. The oil filter assembly for a roller bearing assembly according to claim 1, wherein said annular oil filter plate is a cloth made of high-molecular inorganic fibers.

6. The oil filter assembly for a roller bearing assembly according to claim 5, wherein said cloth has a mesh size such that said cloth allows permeation of fine dusts having particular size smaller than 50–70 microns.

7. The oil filter assembly for a roller bearing assembly according to claim 5, wherein said annular projection of said annular rubber mold means has a circular cross-section, and further wherein a radius of curvature of said circular cross-section is longer than that of said wide annular groove.

* * * * *